(12) United States Patent
Liu et al.

(10) Patent No.: US 6,907,165 B2
(45) Date of Patent: Jun. 14, 2005

(54) METHODS OF FABRICATING A REGENERATED OPTICAL WAVEGUIDE GRATING

(75) Inventors: Yu Liu, Birmingham (GB); John A R Williams, Birmingham (GB); Lin Zhang, Birmingham (GB); Ian Bennion, Birmingham (GB)

(73) Assignee: Aston Photonic Technologies Ltd., Southampton (GB)

( * ) Notice: Subject to any disclaimer, the term of this patent is extended or adjusted under 35 U.S.C. 154(b) by 260 days.

(21) Appl. No.: 10/215,203

(22) Filed: Aug. 9, 2002

(65) Prior Publication Data

US 2003/0072530 A1 Apr. 17, 2003

(30) Foreign Application Priority Data

Oct. 16, 2001 (EP) ............................................. 01308804

(51) Int. Cl.[7] ................................................ G02B 6/34
(52) U.S. Cl. ......................................................... 385/37
(58) Field of Search .......................................... 385/37

(56) References Cited

U.S. PATENT DOCUMENTS 6,221,566 B1   4/2001   Kohnke et al.

FOREIGN PATENT DOCUMENTS

EP   WO 00/67054   11/2000

OTHER PUBLICATIONS

"Manufacture of Photonics Components with a Deep UV Laser Source at 255nm", Booth et al, Proceedings, ICALEO, Laser Institute of America, 2001, Paper M203.*

"Bragg grating inscriptions within strained monomode high NA germania–doped fibres: part I. Experimentation", Taunay et al,J. Physics D: Applied Physics 30 (1997) pp. 40–52.*

"UV induced stress field during Bragg grating inscription in optical fibres", Kherbouche et al, Journal of Physics A: Pure and Applied Optics 3, (2001) pp. 429–439.*

"Correlation of ultraviolet–induced stress changes and negative index growth in type IIa germanosilicate waveguide gratings", Canning et al, Optics Letters, Apr. 1, 1999, vol. 24, No. 7, pp. 463–465.*

"Short Period Fiber Gratings". Putnam, OFC 1998 Technical Digest,TUA1.*

(Continued)

*Primary Examiner*—Hemang Sanghavi
*Assistant Examiner*—Scott Alan Knauss

(57) ABSTRACT

A regenerated optical waveguide is fabricated by hydrogenating an optical waveguide (12) and exposing a grating section (28) to a UV laser beam interference fringe pattern (14) to form a Type I grating. The grating section (28) is exposed for a second period to erase the Type I grating, and then a third period to cause a regenerated optical waveguide grating to form. The resonant wavelength increases during the third period from being substantially the same as the final wavelength of the Type I grating.

14 Claims, 7 Drawing Sheets

OTHER PUBLICATIONS

"Densification Involved in the UV–Based Photosensitivity of Silica Glasses and optical fibers", Douay et al, Journal of Lightwave Technology, vol. 15, No. 8, Aug. 1997, pp. 1329–1342.*

"Grating Formation in a germanium free silicon oxynitride fibre" Dianov et al, IEE, 1997, 4/1–4/6.*

"Polarization selectivity of gratings written in Hi–Bi fibers by the external method", Niay et al, IEEE Photonics Technology Letter vol. 7, No. 4, Apr. 1995, pp. 391–393.*

H. Poignant, et al., "Influence of $H_2$ Loading on the Kinetics of Type IIA Fibre Bragg Grating Photoinscription", IEE Colloquium on Optical Fibre Gratings, (Ref. No. 1997/037), London, U.K., Feb. 1997, pp. 2/1–7, XP002191946.

T. Taunay, et al., Bragg Grating Inscriptions Within Strained Monomode High NA Germania–Doped Fibres: Part I. Experimentation, Journal of Physics D. Applied Physics, IOP Publishing, Bristol, GB, vol. 30, No. 1, Jan. 7, 1997, pp. 40–52, XP000996889.

* cited by examiner

METHODS OF FABRICATING A REGENERATED OPTICAL WAVEGUIDE GRATING

FIELD OF THE INVENTION

The invention relates to methods of fabricating a regenerated optical waveguide grating.

BACKGROUND TO THE INVENTION

By exposing the core of a photosensitive optical fibre to a UV laser interference pattern, its refractive index is changed periodically, thereby producing a fibre Bragg grating (FBG). The photosensitivity of an optical fibre may be increased by hydrogenating the fibre. In this specification hydrogenation of an optical fibre is understood to mean loading an optical fibre with hydrogen or an isotope of hydrogen, such as deuterium.

A number of FBG types have been distinguished, characterised by markedly different spectral and thermal behaviours, originating from the UV excitation of several distinct physical mechanisms. During the typical inscription process, the resonant wavelength of the grating increases with UV exposure duration, indicative of the induction of a positive change in refractive index. The resulting FBG has come to be referred to as a Type I grating, and is the type most commonly fabricated using either free-space holographic or phase mask exposure techniques. However, at high temperatures this FBG is the least stable of the grating types reported to date.

With further UV exposure, the Type I grating growth becomes saturated, and formation of the so-called Type IIA grating commences. The observed reflectivity decreases almost to zero before increasing again and, eventually, saturating. The resonant wavelength of the grating decreases during this stage of the exposure, indicating a negative induced refractive index change. Type IIA gratings are usually inscribed at a wavelength of 193 nm and although the underlying mechanism is still not wholly clarified, links to stress and defect concentrations have been identified.

SUMMARY OF THE INVENTION

According to a first aspect of the present invention there is provided a method of fabricating a regenerated optical waveguide grating, the method comprising the steps of:
  a) hydrogenating an optical waveguide;
  b) generating a UV laser beam interference fringe pattern;
  c) exposing a grating section of the hydrogenated optical waveguide to the UV laser beam interference fringe pattern for a first exposure period, to thereby cause a Type I grating to form within the grating section;
  d) exposing the grating section to the interference fringe pattern for a second exposure period, to thereby cause the Type I grating to be erased; and,
  e) exposing the grating section to the interference fringe pattern for a third exposure period, to thereby cause a regenerated optical waveguide grating to form within the grating section,
    the resonant wavelength of the regenerated grating at the start of the third exposure period being substantially the same as the final wavelength of the Type I grating,
    and the resonant wavelength of the regenerated grating shifting to a longer wavelength during the third exposure period.

The optical waveguide is preferably an optical fibre. The optical fibre may be Boron-Germania co-doped optical fibre or may be standard telecoms fibre. The optical waveguide grating is preferably an optical fibre grating, and may be a fibre Bragg grating.

The UV laser beam interference pattern may be generated using a known two-beam holographic grating fabrication technique. The UV laser beam interference pattern may alternatively be generated using a known phase-mask grating fabrication technique.

The third exposure period is desirably longer than the sum of the first and second exposure periods. The first, second and third exposure period preferably run consecutively to thereby form a single exposure.

The wavelength red-shift undergone by the regenerated grating during the third exposure period may be up to approximately 18 nanometers.

A higher order fibre core mode may additionally be generated during the third exposure period, giving rise to a second Bragg resonance, separated from the primary Bragg resonance of the regenerated grating, within the optical spectrum of the regenerated grating.

According to a second aspect of the present invention there is provided an alternative method of fabricating a regenerated optical waveguide grating, the method comprising the steps of:
  a) hydrogenating an optical waveguide;
  b) exposing a grating section of the hydrogenated optical waveguide to UV laser light for a first exposure period, to thereby cause the refractive index of the grating section of the optical waveguide to increase to a value equivalent to the refractive index which would be obtained as a result of formation and erasure of a Type I grating;
  c) generating a UV laser beam interference fringe pattern; and,
  d) exposing the grating section to the UV laser beam interference fringe pattern for a second exposure period, to thereby cause a regenerated optical waveguide grating to form within the grating section,
    the resonant wavelength of the regenerated grating at the start of the third exposure period being substantially equal to the period of the UV interference fringe pattern multipled by the refractive index of the grating section,
    and the resonant wavelength of the regenerated grating shifting to a longer wavelength during the third exposure period.

The optical waveguide is preferably an optical fibre. The optical fibre may be Boron-Germania co-doped optical fibre or may be standard telecoms fibre. The optical waveguide grating is preferably an optical fibre grating, and may be a fibre Bragg grating.

The UV laser beam interference pattern may be generated using a known two-beam holographic grating fabrication technique. The UV laser beam interference pattern may alternatively be generated using a known phase-mask grating fabrication technique.

The second exposure period is desirably longer than the first exposure period. The first and second exposure periods preferably run consecutively to thereby form a single exposure.

The wavelength shift undergone by the regenerated grating during the second exposure period may be up to approximately 18 nanometers.

A higher order fibre core mode may additionally be generated during the second exposure period, giving rise to a second Bragg resonance, separated from the primary Bragg resonance of the regenerated grating, within the optical spectrum of the regenerated grating.

BRIEF DESCRIPTION OF THE DRAWINGS

An example of the present invention will now be described in detail with reference to the accompanying drawings, in which.

DETAILED DESCRIPTION

Figure 1:
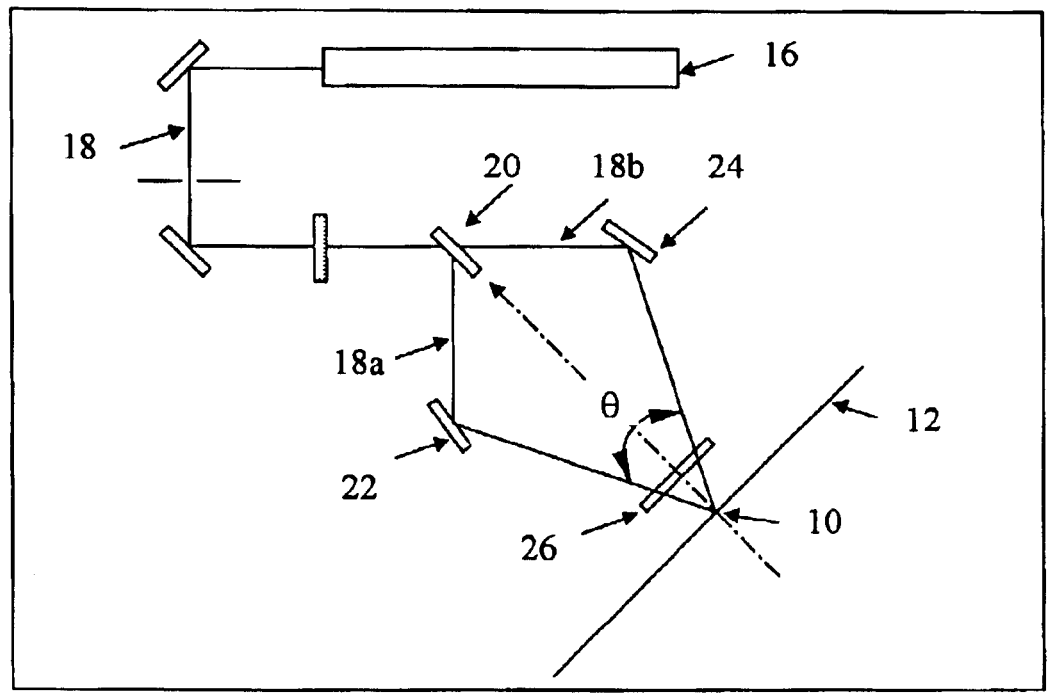
FIG. 1 is a diagrammatic representation of the apparatus used to implement the two-beam holographic interferometric fibre Bragg grating fabrication technique.

Referring to the drawings, a method of fabricating a regenerated optical waveguide grating, which in this example takes the form of a fibre Bragg grating 10, is described. In this example the grating 10 is fabricated in Boron-Germania co-doped optical fibre 12, but it will be appreciated by the skilled person that other photosensitive optical waveguides may be used, such as standard telecoms fibre.

Figure 2:
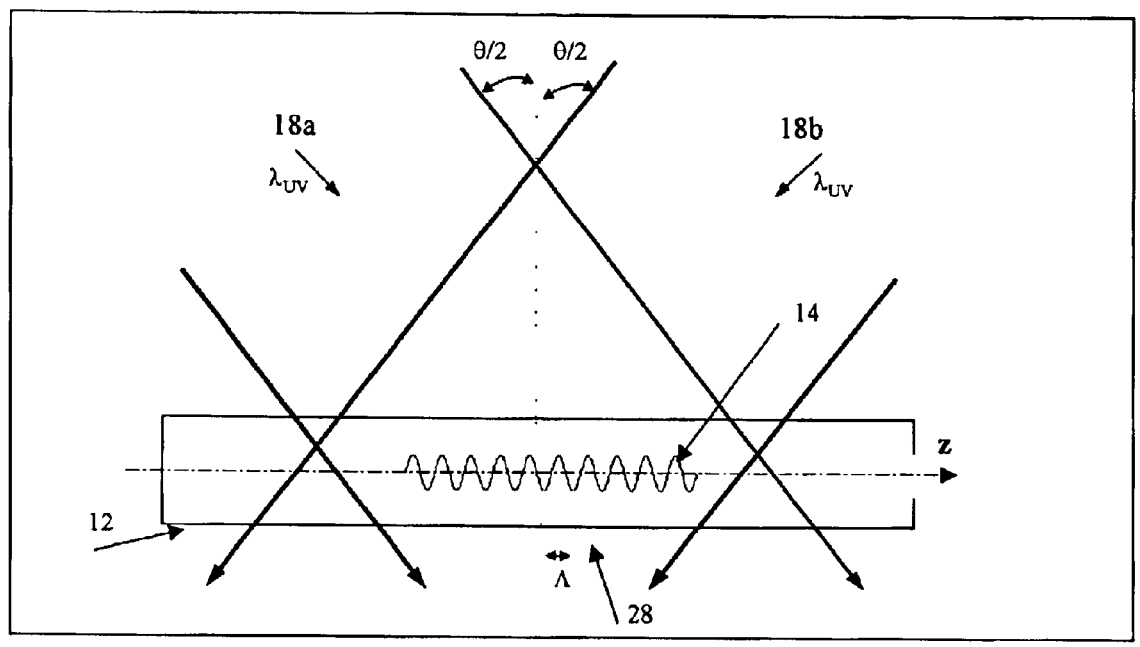
FIG. 2 is a diagrammatic representation of the generation of a UV interference fringe pattern using the apparatus of FIG. 1.

The fibre 12 is first hydrogen loaded using a process well known to the skilled person, so it will not be described in detail here. A UV laser beam interference fringe pattern 14 is generated using a known two-beam holographic interferometric technique for fabricating fibre Bragg gratings (FBG). The apparatus used in this technique is shown in FIG. 1 and comprises a laser 16 operable to generate a CW laser beam 18 of 244 nm wavelength and 60 mW power, having an 8 mm beam width. The laser beam 18 is split into two secondary beams 18a, 18b of equal power by a 50:50 beamsplitter 20. The secondary laser beams 18a, 18b travel to highly reflective mirrors 22, 24 respectively where they are then reflected towards one another. The two secondary laser beams 18a, 18b pass through a cylindrical lens 26 which focuses the two secondary beams 18a, 18b in one axis only. The two focused secondary laser beams 18a, 18b then meet and interfere with one another to produce a pattern of interference fringes 14, as illustrated in FIG. 2.

To fabricate a FBG, a grating section 28 of a photosensitive optical fibre 12 is located within the region in which the interference fringes 14 are to be produced while the laser beam 18 is blocked off. The laser beam 18 is then unblocked, causing the grating section 28 to be exposed to the UV interference fringe pattern 14.

Figures 3, 4:
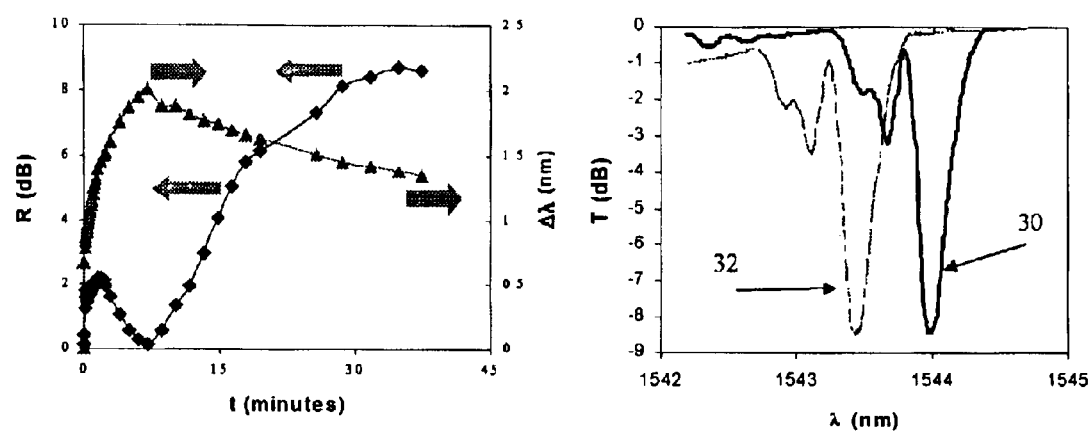
FIG. 3 shows experimental measurements of the reflectivity and wavelength shift as a function of exposure time for a Type IIA grating fabricated in non-hydrogenated Boron-Germania co-doped optical fibre.
FIG. 4 shows the transmission spectra of the Type IIA grating before and after annealing.

The method of fabricating a regenerated FBG was experimentally implemented as follows. As a reference, Type I and Type IIA FBGs were fabricated, as described above, in non-hydrogenated Boron-Germania co-doped optical fibre. A Type I FBG having a maximum reflectivity (R) of 2.2 dB was obtained for a first exposure period (T) of approximately 2 minutes, as shown in FIG. 3. With continuing exposure the reflectivity of the Type I FBG was observed to decrease and fell to zero after a further (second) exposure period of approximately 5 minutes. A maximum red-shift (to longer wavelengths) of the resonant wavelength of the Type I FBG of ~2.0 nm was observed.

Continuing to expose the optical fibre to the UV interference fringe pattern 14 for a further (third) exposure period, the reflectivity of the grating was observed to increase from zero, accompanied by a blue-shift (to shorter wavelengths) in its resonant wavelength. This is characteristic of a Type IIA grating, and indicates a negative induced refractive index change within the optical fibre. Limited by the wavelength and optical power of the UV laser beam, the Type IIA grating attained a maximum reflectivity of 8.7 dB and a resonant wavelength blue-shift of 0.66 nm after a further exposure of 30 minutes to the UV interference fringe pattern, giving a total exposure time of 37 minutes. The optical spectrum 30, in transmission (T), of the Type IIA FBG is shown in FIG. 4.

Following fabrication, the Type IIA FBG was annealed for 12 hours at 70° C. This induced a further blue-shift of the resonant wavelength of 0.55 nm, due to relaxation of the photo-induced positive refractive index change. This is apparent in the optical spectrum 32 of the annealed grating, shown in FIG. 4. The reflectivity of the Type IIA FBG remained unchanged following annealing, indicating good thermal stability of the Type IIA FBG.

Experimental implementation of the method of fabricating a regenerated fibre Bragg grating was carried out as follows. A grating section 28 of hydrogenated Boron-Germania co-doped optical fibre 12 was located in the region in which the UV interference fringe pattern 14 is produced, the UV laser beam 18 being blocked as before. The UV laser beam 18 was then unblocked, causing the grating section 28 of the fibre 12 to be exposed to the UV interference fringe pattern 14. Type I grating formation and complete erasure were again observed, over a combined first and second exposure period of approximately 15 minutes. As mentioned above, a small positive change in the refractive index of the fibre occurs during the stage of the fabrication process.

Figure 5:
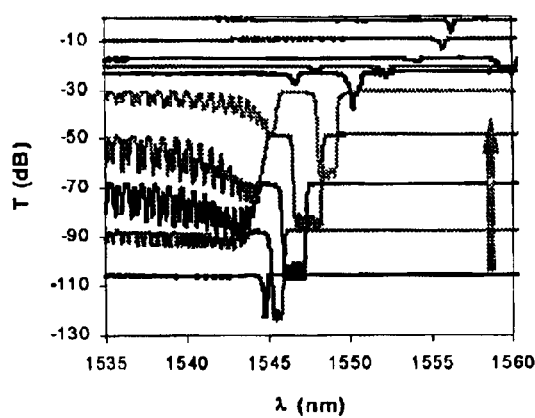
FIG. 5 shows a series of experimentally recorded transmission spectra for a regenerated grating fabricated in hydrogenated Boron-Germania co-doped fibre, illustrating the Resonant wavelength red-shift as a function of exposure time.

As the UV exposure was continued, for a third exposure period of approximately 60 minutes, a regenerated FBG was fabricated. Initially, the resonant wavelength of the regenerated FBG was substantially the same as the final resonant wavelength of the erased Type I grating. However, over the duration of the third exposure period the resonant wavelength of the regenerated FBG underwent a significant red-shift, as illustrated in FIG. 5, in which the exposure time increases in the direction of the arrow. The observed wavelength red-shift indicates that a large positive refractive index change has occurred within the optical fibre core during the third exposure period.

Figure 6:
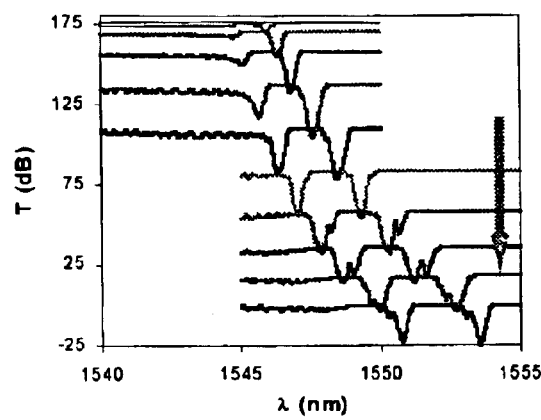
FIG. 6 shows a series of experimentally recorded transmission spectra for a regenerated grating fabricated in hydrogenated standard telecoms fibre, illustrating the resonant wavelength red-shift as a function of exposure time.

Fabrication of a regenerated FBG was also carried out using hydrogenated standard telecoms fibre. Similar grating growth behaviour was observed, as shown in FIG. 6, in which the exposure time increases in the direction of the arrow.

Figure 7:
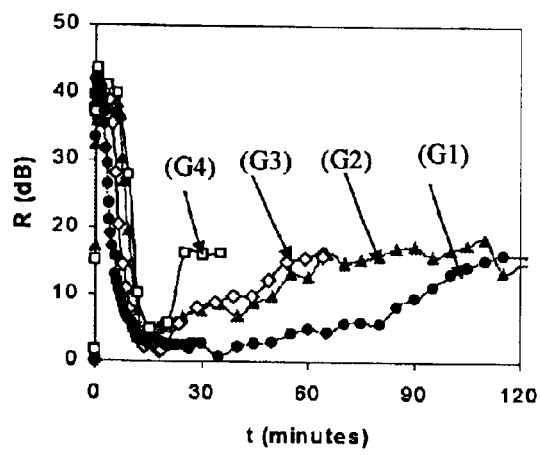
FIG. 7 shows the variation of reflectivity with exposure time for four regenerated gratings (G1–G4) fabricated in hydrogenated Boron-Germania co-doped fibre.
Figure 8:
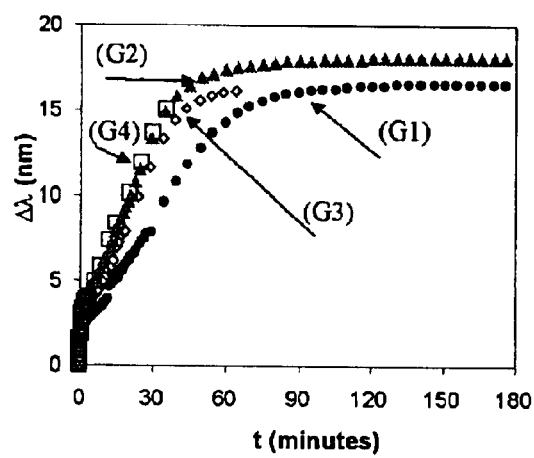
FIG. 8 shows resonant wavelength red-shift as a function of exposure time for the same four gratings (G1–G4)

A series of a further four regenerated FBGs (G1–G4) were fabricated in the hydrogenated Boron-Germania co-doped optical fibre. FIGS. 7 and 8 show the measured reflectivity (R) and wavelength red-shift ($\Delta\lambda$) respectively for each grating (G1–G4) as function of UV exposure time (t). The behaviour of each grating is similar. After a combined first and second exposure period of approximately 15 minutes, Type I gratings have been fabricated and then completely erased. After a third exposure period of approximately 45 minutes (giving a total exposure time of approximately 60 minutes), a regenerated FBG is formed and has attained its maximum reflectivity of ~16 dB. The regenerated FBGs exhibited wavelength red-shifts as high as 18 nm.

For this Boron-Germania co-doped fibre, an 18 nm red-shift is calculated to correspond to a positive refractive index change of the fibre core of $\Delta n=1.68\times10^{-2}$. It is noteworthy that the calculated refractive index change for the exposed fibre core causes an increase in the numerical aperture of the fibre by a factor 2.6. In the transmission (T) spectrum 32 of the regenerated grating, shown in FIG. 9, a higher order core mode 34 is apparent, having a reflectivity of 6 dB. The higher order mode 34 is separated from the primary Bragg resonance (at the resonant wavelength) 36 by 5.9 nm. (Higher order modes are also apparent in FIGS. 5 and 6).

The regenerated FBG was annealed for 12 hours at 70° C. The annealing process caused a blue-shift in the resonant wavelength of the regenerated FBG of 2~3 nm. The annealing of the regenerated FBG also caused a significant decrease in the coupling strength of the regenerated FBG, as shown by the reduced amplitude of the faint transmission spectrum 38 of FIG. 9.

Figure 9:
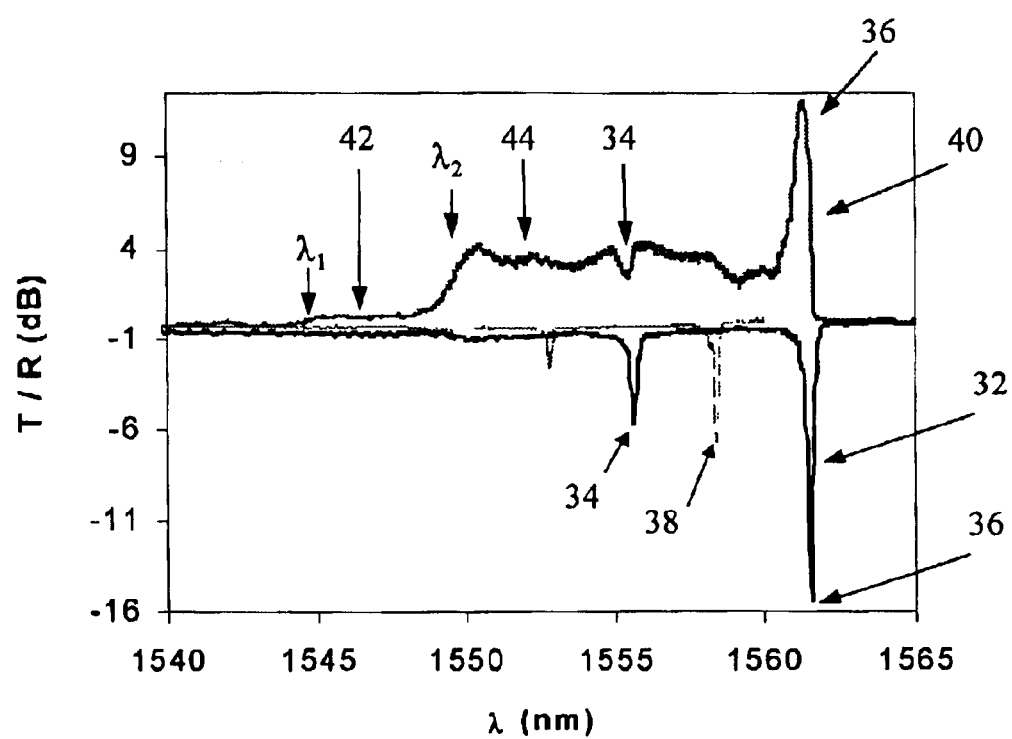
FIG. 9 shows experimentally measured reflection (R) and transmission (T) spectra of a regenerated grating fabricated in hydrogenated Boron-Germania co-doped fibre, following a total UV exposure time of ~1 hour; and, FIG. 10 shows experimental measurements of resonant wavelength shifts as a function of applied temperature for a Type I grating and regenerated grating fabricated in Boron-Germania co-doped fibre.

FIG. 9 also shows the overall reflection (R) spectrum 40 of the regenerated grating, including the primary Bragg resonance 36. Two plateaux 42, 44 are apparent within the reflection spectrum 40. The first plateau 42 commences at $\lambda_1$~1545 nm and corresponds to the wavelength spectrum of the initially formed Type I grating. The second plateau 44 starts at $\lambda_2$~1550 nm and corresponds to the wavelength region within which the formation of the regenerated grating occurs. The higher order core mode 34 is also clearly visible in the reflection spectrum 40.

For two of the four gratings (G1 and G2) the third UV exposure period was significantly longer, giving a total UV exposure time of 4 hours and 6.5 hours respectively. No significant further changes in either reflectivity or wavelength red-shift were observed for either grating G1 or G2 over the extended third UV exposure period.

Figure 10:
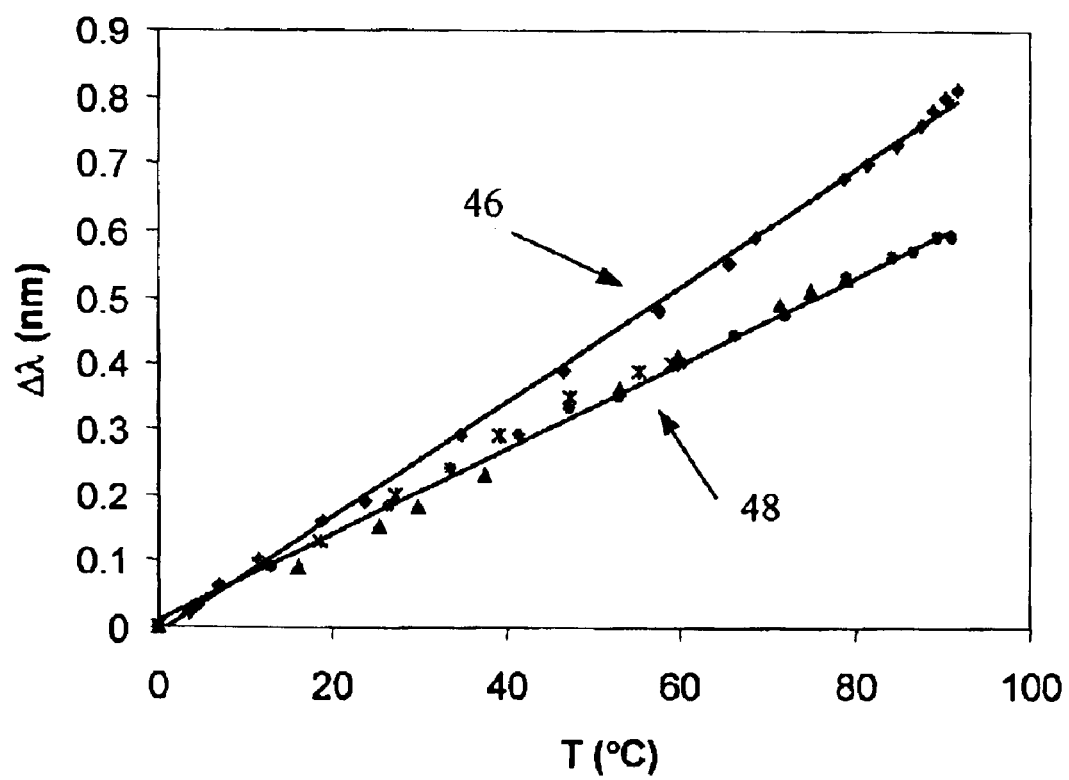

The temperature sensitivity of the regenerated grating was compared with the temperature sensitivity of a reference Type I grating. The change in the resonant wavelength of the Type I grating and of the regenerated grating was measured as increasing temperature was applied to the two gratings. The two sets of results, 46 and 48 respectively, are shown in FIG. 10. The results indicate that the resonant wavelength of the Type I grating changes at a rate of 8.9 pm per degree temperature change. The regenerated grating exhibits a lower rate of change of resonant wavelength with applied temperature of 6.4 pm per degree temperature change.

In conclusion, the regenerated FBGs described above display significantly different behaviour to known Type I and Type IIA gratings. In this example, fabrication of the regenerated grating follows fabrication and erasure of a Type I grating in hydrogenated photosensitive optical fibre. During the third UV exposure period, in which the regenerated grating evolves, the resonant wavelength of the regenerated grating undergoes a substantial red-shift of up to 18 nm. This indicates that an increase in the refractive index of the fibre core as large as $1.68\times10^{-2}$ has occurred. This is in marked contrast with the shift to shorter wavelengths, and the associated negative refractive index change, which is characteristic of Type IIA gratings. The regenerated grating also exhibits a reduced temperature sensitivity with respect to Type I gratings.

Various modifications may be made without departing from the scope of the present invention. Fabrication of a regenerated grating may also follow exposure of the grating section of the optical waveguide to a uniform UV laser beam, the exposure causing the refractive index of the grating section to increase to a value equivalent to the refractive index which would be obtained as a result of formation and erasure of a Type I grating. A uniform UV laser beam exposure may be provided using the apparatus of FIG. 1, modified such that one of the secondary beams 18a, 18b are blocked.

It will be appreciated by the skilled person that regenerated optical waveguide gratings have different resonant (Bragg) wavelengths to those described may be fabricated using the methods of the present invention. Although the UV fringe interference pattern described is generated using the known two-beam holographic grating fabrication technique, it will be appreciated that other ways of generating a UV interference fringe pattern may be used, such as the known phase-mask grating fabrication technique. Regenerated optical waveguide gratings may also be fabricated in different optical waveguides, including different types of optical fibre and planar optical waveguides.

In the method described the UV exposure periods run consecutively, producing a single, combined exposure period, but it will be understood that the exposure periods may run separately to one another, so long as the grating section of the optical waveguide is not moved between exposures.

What is claimed is:

1. A method of fabricating a regenerated optical waveguide grating, comprising:

hydrogenating an optical waveguide;

generating a UV laser beam interference fringe pattern;

exposing a grating section of the hydrogenated optical waveguide to the UV laser beam interference fringe pattern for a first exposure period, to cause a Type I grating to form within the grating section;

exposing the grating section to the interference fringe pattern for a second exposure period, to cause the Type I grating to be erased; and, exposing the grating section to the interference fringe pattern for a third exposure period, to cause a regenerated optical waveguide grating to form within the grating section, the regenerated grating having a resonant wavelength at a start of the third exposure period which is substantially the same as a final wavelength of the UV interference fringe pattern, and the resonant wavelength of the regenerated grating shifting to a longer wavelength during the third exposure period.

2. A method as claimed in claim 1, wherein the third exposure period is longer than a sum of the first and second exposure periods.

3. A method as claimed in claim 1, wherein the first, second and third exposure periods run consecutively to form a single exposure.

4. A method as claimed in claim 1, wherein a higher order fibre core mode is generated during the third exposure period, giving rise to a second Bragg resonance, separated from a primary Bragg resonance of the regenerated grating, within an optical spectrum of the regenerated grating.

5. A method as claimed in claim 1, wherein the optical waveguide is one of a Boron-Germania co-doped optical fibre and a telecoms fibre.

6. A method as claimed in claim , wherein the optical waveguide grating is a fibre Bragg grating.

7. A method as claimed in claim 1, wherein the UV laser beam interference pattern is generated using a two-beam holographic grating fabrication technique or a known phase-mask grating fabrication technique.

8. A method of fabricating a regenerated optical waveguide grating comprising:

hydrogenating an optical waveguide;

exposing a grating section of the hydrogenated optical waveguide to UV laser light for a first exposure period to cause a refractive index change within the grating section of the optical waveguide equivalent to formation and erasure of a Type I grating;

generating a UV laser beam interference fringe pattern after the first exposure period; and, exposing the grating section to the UV laser beam interference fringe pattern for a second exposure period, to cause a regenerated optical waveguide grating to form within the grating section, the regenerated grating having a resonant wavelength at a start of the second exposure period which is substantially the same as a wavelength of the UV interference fringe pattern, and the resonant wavelength of the regenerated grating shifting to a longer wavelength during the second exposure period.

9. A method as claimed in claim 8, wherein the second exposure period is longer than the first exposure period.

10. A method as claimed in claim 8, wherein the first and second exposure periods run consecutively to form a single exposure.

11. A method as claimed in any of claim 8, wherein a higher order fibre core mode is generated during the second exposure period, giving rise to a second Bragg resonance, separated from a primary Bragg resonance of the regenerated grating, within an optical spectrum of the regenerated grating.

12. A method as claimed in claim 8, wherein the optical waveguide is one of a Boron-Germania co-doped optical fibre and a telecoms fibre.

13. A method as claimed in claim 8, wherein the optical waveguide grating is a fibre Bragg grating.

14. A method as claimed in claim 8, wherein the UV laser beam interference pattern is generated using a two-beam holographic grating fabrication technique or a phase-mask grating fabrication technique.

* * * * *